(12) United States Patent
Jeong et al.

(10) Patent No.: US 9,373,860 B2
(45) Date of Patent: Jun. 21, 2016

(54) METHOD AND APPARATUS FOR DIAGNOSING FAULT WITHIN FUEL CELL STACK

(71) Applicants: Hyundai Motor Company, Seoul (KR); Hyundai Autron Co., Ltd., Seongnam, Gyeonggi-do (KR)

(72) Inventors: Kwi Seong Jeong, Gyeonggi-do (KR); Sae Hoon Kim, Gyeonggi-do (KR); Uck Soo Kim, Gyeonggi-do (KR); Hyun-Seok Park, Gyeonggi-do (KR); Young-hyun Lee, Gyeonggi-do (KR)

(73) Assignee: Kangnam University Industry-Academia Cooperation Foundation, Yongon, Gyeonggi-do (KR)

( * ) Notice: Subject to any disclaimer, the term of this patent is extended or adjusted under 35 U.S.C. 154(b) by 309 days.

(21) Appl. No.: 14/102,693

(22) Filed: Dec. 11, 2013

(65) Prior Publication Data
US 2014/0159738 A1   Jun. 12, 2014

(30) Foreign Application Priority Data
Dec. 11, 2012  (KR) .......................... 10-2012-0143883

(51) Int. Cl.
*G01N 27/416* (2006.01)
*H01M 8/04* (2016.01)

(52) U.S. Cl.
CPC ...... *H01M 8/04679* (2013.01); *H01M 8/04492* (2013.01); *H01M 8/04649* (2013.01); *Y02E 60/50* (2013.01)

(58) Field of Classification Search
USPC ....................................................... 324/430
See application file for complete search history.

(56) References Cited

U.S. PATENT DOCUMENTS

| | | | | |
|---|---|---|---|---|
| 2009/0169934 A1* | 7/2009 | Manabe | ............. | G01R 31/3662 429/430 |
| 2010/0141262 A1* | 6/2010 | Watanabe | ......... | H01M 8/04358 324/430 |
| 2010/0216043 A1* | 8/2010 | Gottmann | ......... | H01M 8/04552 429/432 |
| 2010/0286939 A1 | 11/2010 | Oh et al. | | |
| 2012/0064424 A1* | 3/2012 | Fuss | .................. | H01M 8/04835 429/431 |
| 2012/0135327 A1 | 5/2012 | Jeong et al. | | |

FOREIGN PATENT DOCUMENTS

| | | |
|---|---|---|
| KR | 10-2010-0121354 A | 11/2010 |
| KR | 10-1090705 B1 | 12/2011 |

* cited by examiner

*Primary Examiner* — Robert Grant
(74) *Attorney, Agent, or Firm* — Mintz Levin Cohn Ferris Glovsky and Popeo, P.C.; Peter F. Corless

(57) ABSTRACT

To diagnose a fault of a fuel cell stack, an alternating current having a first optimal frequency of a first frequency domain to diagnose a drop in cell voltage and an alternating current having a second optimal frequency of a second frequency domain to diagnose a cause of the drop in cell voltage are supplied to the fuel cell stack are provided. A distortion rate is then calculated based on voltage of the fuel cell stack according to the alternating current of the first optimal frequency, and the drop in cell voltage is diagnosed based on the calculated distortion rate. Also, impedance is calculated based on voltage and a current of the fuel cell stack according to the alternating current of the second optimal frequency and amount of water is calculated based on the calculated in the fuel cell stack, and the cause of the drop in cell voltage is diagnosed based on the calculated impedance and amount of water.

8 Claims, 5 Drawing Sheets

METHOD AND APPARATUS FOR DIAGNOSING FAULT WITHIN FUEL CELL STACK

CROSS-REFERENCE TO RELATED APPLICATION

This application claims priority to and the benefit of Korean Patent Application No. 10-2012-0143883 filed in the Korean Intellectual Property Office on Dec. 11, 2012, the entire contents of which are incorporated herein by reference.

BACKGROUND (a) Field of the Invention

The present invention relates to a method and an apparatus to diagnose a fault of a fuel cell stack.

(b) Description of the Related Art

A fuel cell is a type of battery that directly converts chemical energy generated by oxidation of fuel to electrical energy which can be utilized by any number of devices. For the most part, a fuel cell is identical to a chemical cell in that it uses an oxidation and reduction reaction to produce energy. However, in a fuel cell, reactants are intermittently supplied from an outside source and thus, reaction products are consecutively removed from a fuel cell system. In a chemical cell, however, the battery reaction is performed within a closed system.

Currently, commercialization of the fuel cell has begun to take off because the reaction product of the fuel cell is pure water and thus is very environmentally friendly. Accordingly, research for using fuel cells as an energy source for vehicles is of great interest in the automotive industry.

A fuel cell is often made up of a stack assembly in which a plurality of unit cells are consecutively disposed one on top of/next to the other, which is referred to within the industry as a fuel cell stack. Electrical energy is produced by providing each unit cell of the fuel cell stack with hydrogen as a fuel and oxygen as an oxidizer. However, when performance deterioration or a failure occurs in any one cell among the unit cells that make up the fuel cell stack, the entire performance of the fuel cell stack is deteriorated and thus, a stable operation is not provided.

In the related art, performance of the fuel cell stack is diagnosed by measuring voltage output from each unit cell of the fuel cell stack. Such diagnosis method includes a total harmonic distortion analysis (THDA) method. The THDA method diagnoses cell voltage by calculating a distortion rate through frequency analysis of the stack voltage. Even though the THDA method may easily detect a drop in cell voltage, it is substantially difficult to quantitatively measure what has caused the drop in cell voltage.

Also, there is a method of measuring impedance of the fuel cell stack using an electrochemical impedance spectroscopy (EIS). This method supplies a current or voltage as a sinusoidal waveform to the fuel cell stack and then measures a current (I) and voltage (V) of the fuel cell stack and calculates impedance based on the measured current (I) and voltage (V) of the fuel cell stack.

However, this method diagnoses the humidification state by measuring the load on a stack, but does not diagnose the drop in cell voltage. Accordingly, a separate apparatus such as a space vector modulator (SVM) or a capacitive voltage multiplier (CVM) is required.

The above information disclosed in this Background section is only for enhancement of understanding of the background of the invention and therefore it may contain information that does not form the prior art that is already known in this country to a person of ordinary skill in the art.

SUMMARY

The present invention has been made in an effort to provide a fault diagnosis method and apparatus that may diagnose a drop in cell voltage of a fuel cell stack and may quantitatively determining the cause of the drop in cell voltage.

An exemplary embodiment of the present invention provides a method of diagnosing a fault of a fuel cell stack. More specifically, a plurality of alternating current as driving currents having different frequency combinations are supplied the fuel cell stack, and a distortion rate and impedance of the fuel cell stack for each alternating current is measured. Based upon the measured distortion rate and impendence, an optimal frequency may be selected and an alternating current having the selected optimal frequency may then be supplied to the fuel cell stack. The distortion rate of the fuel cell stack may then be calculated according to the alternating current having the optimal frequency, and a drop in cell voltage may be diagnosed based on the calculated distortion rate. Likewise, the impedance of the fuel cell stack may be calculated according to the alternating current having the optimal frequency and amount of water in the fuel stack may be calculated based on the calculated impedance, and a cause of the drop in cell voltage may be diagnosed based on the calculated impedance and amount of water.

In some exemplary embodiments of the present invention, the supplying of the plurality of alternating currents to the fuel cell stack may include supplying, to the fuel cell stack, an alternating current having a first frequency of a first frequency domain to diagnose the drop in cell voltage and an alternating current having a second frequency of a second frequency domain to diagnose the cause of the drop in cell voltage. In this embodiment, the first frequency and the second frequency may be different from each other.

Additionally, in some exemplary embodiments, selecting of the optimal frequency may include: selecting a first frequency of an alternating current corresponding to the largest distortion rate as a first optimal frequency to diagnose the drop in cell voltage, based on the distortion rates measured for the respective alternating currents; and selecting a second frequency of an alternating current corresponding to the largest impedance as a second optimal frequency to diagnose the cause of the drop in cell voltage, based on the impedances measured for the respective alternating currents.

Another exemplary embodiment of the present invention provides an alternative method of diagnosing a fault of a fuel cell stack. More specifically, in this method, an alternating current having a first optimal frequency of a first frequency domain that diagnoses a drop in cell voltage and an alternating current having a second optimal frequency of a second frequency domain that diagnoses a cause of the drop in cell voltage are both supplied to the fuel cell stack. Then a distortion rate is calculated based on voltage of the fuel cell stack according to the alternating current of the first optimal frequency, and the drop in cell voltage is diagnosed based on the calculated distortion rate. Likewise, impedance is calculated based on the voltage and a current of the fuel cell stack according to the alternating current of the second optimal frequency and amount of water in the fuel stack may be calculated based on the calculated impedance, and the cause of the drop in cell voltage is diagnosed based on the calculated impedance and amount of water.

Here, the diagnosing of the drop in cell voltage may diagnose the drop in cell voltage based on a total harmonic distortion analysis (THDA) method, and the diagnosing of the cause of the drop in cell voltage may measure the impedance using an electromechanical impedance spectroscopy (EIS) and diagnose the cause of the drop in cell voltage.

Still another exemplary embodiment of the present invention provides an apparatus to diagnose a fault of a fuel cell stack. More specifically, the apparatus includes an alternating current (AC) injector connected to the fuel cell stack and applying an alternating current to a current which flows from the fuel cell stack to a load. The apparatus also includes an AC current generator that is configured to generate the alternating current. A diagnosis processor is also configured to measure a voltage and a current of the fuel cell stack, to diagnose a drop in cell voltage of the fuel cell stack and to diagnose the cause of the drop in cell voltage based on the measured voltage and current.

In some exemplary embodiments, the AC current generator may supply an alternating current having a first optimal frequency of a first frequency domain to diagnose the drop in cell voltage and an alternating current having a second optimal frequency of a second frequency domain to diagnose the cause of the drop in cell voltage.

Furthermore, the diagnosis processor may include: an optimal frequency selection section configured to select the first optimal frequency to diagnose the drop in cell voltage and the second optimal frequency to diagnose the cause of the drop in cell voltage; an alternating current control section configured to control the AC current generator; a distortion rate calculating section configured to measure the voltage of the fuel cell stack, and to calculate a distortion rate of the fuel cell stack based on the measured voltage; an impedance/water calculating section configured to measure the voltage and the current of the fuel cell stack and amount of water in the fuel cell stack based on the calculated impedance, and to calculate an impedance based on the measured voltage and current; and a diagnosis section configured to diagnose the drop in cell voltage of the fuel cell stack based on the distortion rate, and to diagnose the cause of the drop in cell voltage based on the impedance and amount of water.

According to an exemplary embodiment of the present invention, it is possible to simultaneously measure a drop in cell voltage of a fuel cell stack as well as determine the cause of the drop in cell voltage. Also, by simultaneously diagnosing the drop in cell voltage and the cause of the drop in cell voltage using a single apparatus, it is possible to reduce a size of an apparatus to diagnose the error/failure of the fuel cell stack and to reduce costs related to apparatus production. Also, it is possible to more accurately diagnose the fault of the fuel cell stack by obtaining an optimal frequency to diagnose the drop in cell voltage of the fuel cell stack and the cause of the drop in cell voltage at the same time.

DETAILED DESCRIPTION OF THE EMBODIMENTS

Figure 1:
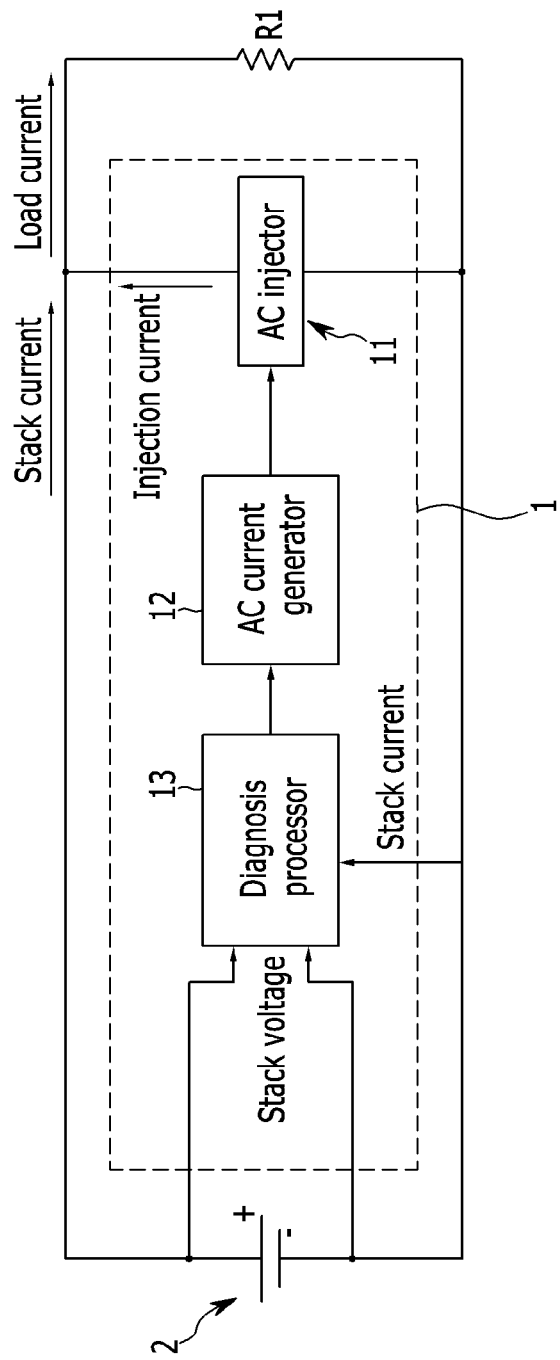
FIG. 1 is a diagram illustrating a structure of an apparatus to diagnose a fault of a fuel cell stack according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In the specification, unless explicitly described to the contrary, the word "comprise/include" and variations such as "comprises/includes" or "comprising/including", will be understood to imply the inclusion of stated elements but not the exclusion of any other elements.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Additionally, it is understood that the below methods are executed by at least one controller including a specially configured processor (e.g., fault diagnosis apparatus 1). The term controller refers to a hardware device that includes a memory and a processor. The memory is configured to store the modules and the processor is specifically configured to execute said modules to perform one or more processes which are described further below.

Furthermore, the control logic of the present invention may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Furthermore, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, a method and an apparatus to diagnose a fault of a fuel cell stack according to an exemplary embodiment of the present invention will be described with reference to the accompanying drawings.

FIG. 1 is a diagram illustrating a structure of an apparatus to diagnose a fault of a fuel cell stack according to an exemplary embodiment of the present invention. As shown in FIG. 1, an apparatus 1 (hereinafter, referred to as ("fault diagnosis apparatus 1") that diagnoses a fault of a fuel cell stack 2 according to an exemplary embodiment of the present invention includes an alternating current (AC) injector 11 connected to the fuel cell stack 2, an AC current generator 12 configured to generate an AC signal for operating the AC injector 11, and diagnosis processor 13 configured to perform a fault diagnosis and impedance measurement and amount of water by measuring voltage and a current of the fuel cell stack 2.

As one exemplary way of executing fault diagnosis of the fuel cell stack 2, the AC injector 11, (which is connected to the fuel cell stack 2) may include electronic devices (e.g., transistor) to enable a stack current to have an AC component. Meanwhile, a load R1 may be connected to the fault diagnosis apparatus 1. The load R1 refers to all of the parts that use electricity generated from the fuel cell stack 2. The load consumes power from a fuel cell, and may include, for example, an inverter, a motor, a direct current (DC) to DC (DC-DC) converter, a battery, and the like.

Additionally, a terminal on one side of the load R1 may be connected to the first terminal of the fuel cell stack 2, and a terminal on the other side of the load R1 may be connected to the second terminal of the fuel cell stack 2.

Accordingly, the stack current output from the fuel cell stack 2 and a current output from the AC injector 11 are add and flow through the load R1. A current that outputs from the AC injector 11 is referred to as an injection current, and a current that flows through the load R1 is referred to as a load current.

Figure 2A:
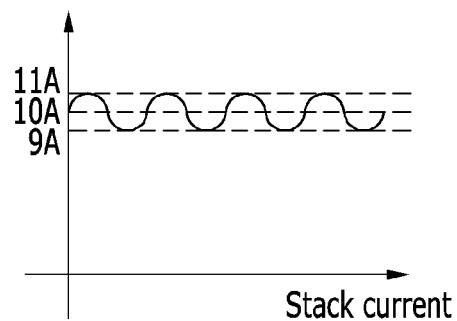
FIGS. 2A-C is a graph illustrating a characteristic of a stack current according to an exemplary embodiment of the present invention.
Figure 2B:
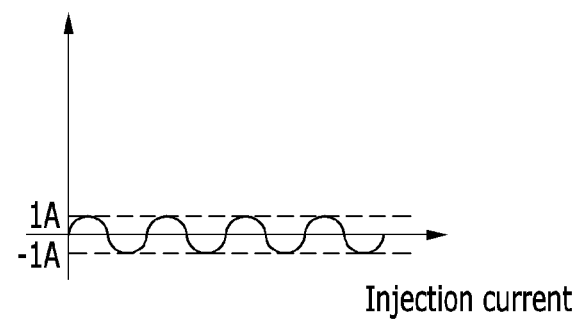
Figure 2C:
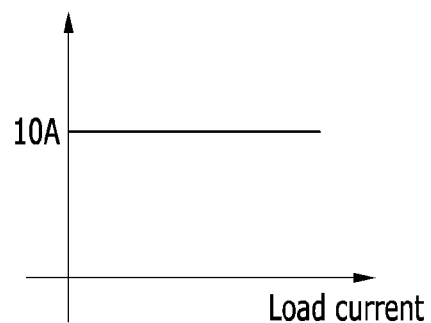

FIGS. 2A-C are graphs illustrating a characteristic of a stack current according to an exemplary embodiment of the present invention. In the illustrative graphical representation, the injection current that is output from the AC injector 11 has an AC component according to an operation of the AC current generator 12 as shown in FIG. 2B, and the load current has a DC component as shown in FIG. 2C. As shown in FIG. 2C, the load current may be expressed as a summation of the stack current and the injection current.

The AC current generator 12 generates an AC signal for driving the AC injector 11. The AC current generator 12 generates an AC signal according to a control signal output from the diagnosis processor 13.

The diagnosis processor 13, on the other hand, measures voltage and a current that are output from the fuel cell stack 2. That is, the stack voltage and the stack current that are output, and diagnoses a drop in cell voltage based on the measured voltage and current. The diagnosis processor 13 also measures impedance and amount of water and thereby based on this impedance and amount of water is able to deduce the cause of the drop in cell voltage.

Figure 3:
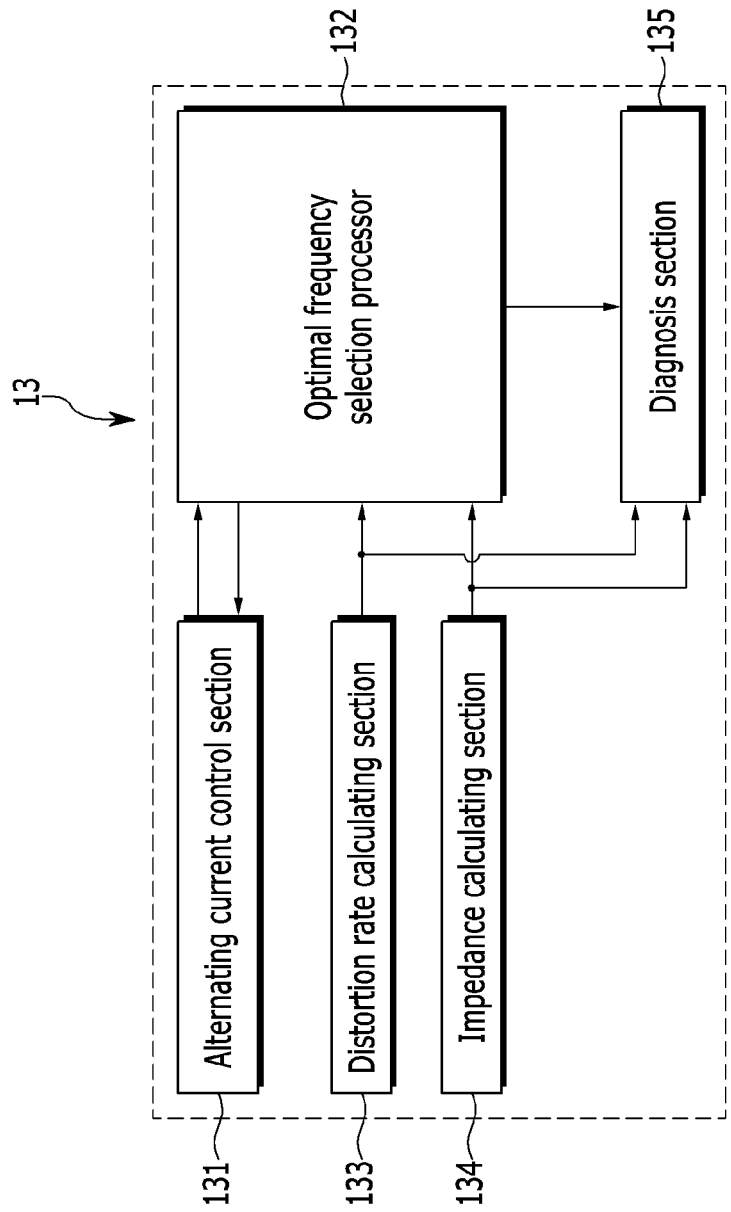
FIG. 3 is a diagram illustrating a structure of a diagnosis processor according to an exemplary embodiment of the present invention.

FIG. 3 is a diagram illustrating a structure of the diagnosis processor 13 according to an exemplary embodiment of the present invention. As shown in FIG. 3, the diagnosis processor 13 according to an exemplary embodiment of the present invention includes an alternating current control section 131, an optimal frequency selection processing section 132, a distortion rate calculating section 133, an impedance/water calculating section 134, and a diagnosis section 135.

The alternating current control section 131 outputs a control signal to the AC current generator 12 to diagnose the fault of the fuel cell stack 2 and to generate an alternating current to diagnose a cause of a drop in cell voltage.

In some exemplary embodiments of the present invention, a plurality of alternating currents of different frequency domains may be used in order to diagnose a drop in cell voltage and the cause of the drop in cell voltage. A distortion rate in this embodiment may be calculated to diagnose the fault of the fuel cell stack 2, and the drop in cell voltage may be diagnosed based on the calculated distortion rate. A frequency domain (e.g., a first frequency domain) for the above fault diagnosis is, for example, about 10 Hz. On the other hand, impedance of the fuel cell stack 2 may be measured to diagnose the cause of the drop in cell voltage. A frequency domain (e.g., a second frequency domain) for the above impedance measurement is, for example, about 300 Hz. Therefore, according to an exemplary embodiment of the present invention, AC signals of the first frequency domain and the second frequency domain may be used to diagnose the fault and the cause of the drop in cell voltage. For this purpose, for example, by selecting three neighboring frequencies (e.g., about 10 Hz, 8 Hz, and 12 Hz) from the first frequency domain, by selecting three neighboring frequencies (e.g., about 300 Hz, 290 Hz, and 310 Hz) from the second frequency domain, and by combining three frequencies selected from the first frequency domain with three frequencies selected from the second frequency domain, it is possible to use a plurality of alternating driving currents to diagnose the fault of the fuel cell stack 2 and the cause of the drop in cell voltage according to an exemplary embodiment of the present invention. For example, it is possible to use an alternating current of combination of about 10 Hz and about 300 Hz, an alternating current of combination of about 8 Hz and about 290 Hz, and an alternating current of combination of about 12 Hz and about 310 Hz.

As described above, a plurality of alternating currents that includes a plurality of alternating currents of different frequency domains may be used. Control signals may be generated to enable the generation of the plurality of alternating currents. These generated control signals are output to the AC current generator 12. Accordingly, the AC current generator 12 generates different AC signals, that is alternating currents, according to the control signals and then supplies and injects the generated alternating currents to the stack current through the AC injector 11. For example, according to a control signal output from the alternating current control section 131, the AC current generator 12 may generate a first alternating current of combination of about 10 Hz and about 300 Hz, may generate a second alternating current of combination of about 8 Hz and about 290 Hz, and may generate a third alternating current of combination of about 12 Hz and about 310 Hz.

The optimal frequency selection processing section 132 selects an optimal frequency to diagnose the drop in cell voltage and diagnoses the cause of the drop in cell voltage from among the plurality of alternating currents (including an AC signal of the first frequency domain and an AC signal of the second frequency domain) that is supplied to the fuel cell stack 2 for the fault diagnosis.

The distortion rate calculating section 133 measures the stack voltage of the fuel cell stack 2 according to the alternating current, and calculates a distortion rate based on the measured stack voltage. For this section 133, a total harmonic distortion analysis THDA may be used as a method of calculating the distortion rate.

Figure 4:
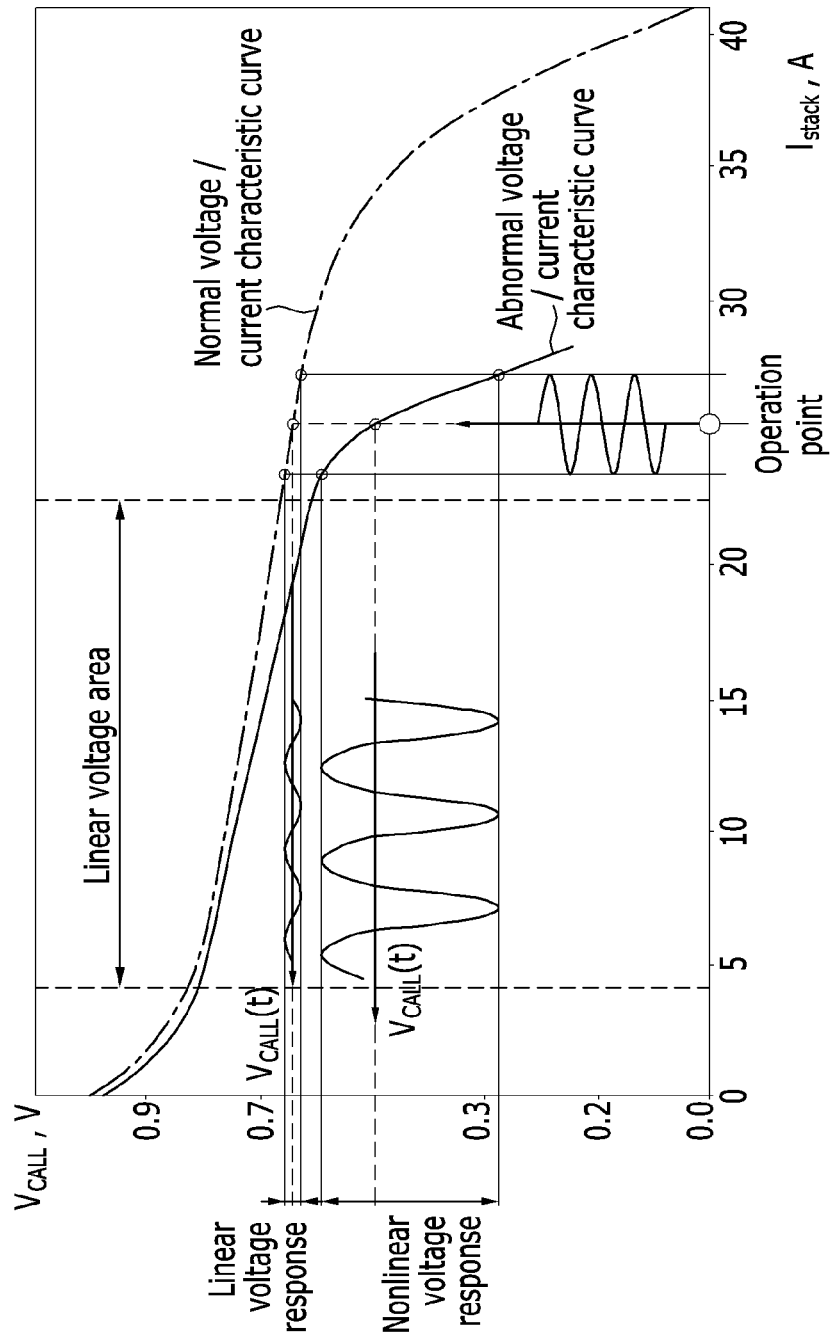
FIG. 4 is a graph illustrating a characteristic of voltage current according to an operation state of each cell of a fuel cell stack.

FIG. 4 is a graph illustrating a characteristic of voltage current according to an operation state of each cell of a fuel cell stack. In general, when a current having a sinusoidal waveform is supplied to the fuel cell stack 2, voltage from a cell that normally operates in the fuel cell stack 2 varies in a linear portion of the graph as indicated by a dotted line of FIG. 4, and voltage from a cell that abnormally operates in the fuel cell stack 2 varies in a nonlinear portion as indicated by a solid line of FIG. 4. Accordingly, it can be known that voltage of a normal cell has a small distortion according to a change in the current, whereas voltage of an abnormal cell has a significant voltage amplitude and a significant distortion according to a change in a cell current. Accordingly, it is possible to diagnose whether the fuel cell stack 2 is faulty by calculating a distortion rate through frequency analysis of the stack current and diagnosing whether the cell voltage has dropped based on the calculated distortion rate.

Meanwhile, the impedance/water calculating section 134 measures the stack voltage and the stack current of the fuel cell stack 2 according to the alternating current, and measures impedance based on the measured stack voltage and stack current, and measures amount of water based on the measured impedance. When an AC loss is present within the fuel cell stack 2, this indicates that a response varies according to a frequency when an AC variation occurs. By measuring the impedance and/or amount of water as a response characteristic, it is possible to quantitatively understand a loss within the fuel cell stack 2, that is, the cause of the drop in cell voltage. For example, a moisture state of the fuel cell stack 2, namely the amount of water, also greatly affects performance and may act as the cause of the drop in cell voltage (e.g., dry-flooding).

The impedance may be calculated by supplying a alternating current or voltage of a sinusoidal waveform to the fuel cell stack 2 and then measuring the stack current and the stack voltage accordingly, performing Fourier transformation of the measured current and voltage, and dividing magnitude of current (I) of a predetermined frequency (w) by magnitude of voltage (v) of the predetermined frequency (w) in a frequency spectrum of the Fourier transformed current and voltage.

Meanwhile, the diagnosis section 135 diagnoses the drop in cell voltage based on the distortion rate calculated by the distortion rate calculating section 133, and diagnoses the cause of the drop in cell voltage based on the impedance and amount of water calculated by the impedance/water calculating section 134.

The diagnosis processor 13 constructed in the above structure may be configured in a form of a microprocessor.

Next, a method of diagnosing a fault of a fuel cell stack according to an exemplary embodiment of the present invention will be described based on the above structure.

Figure 5:
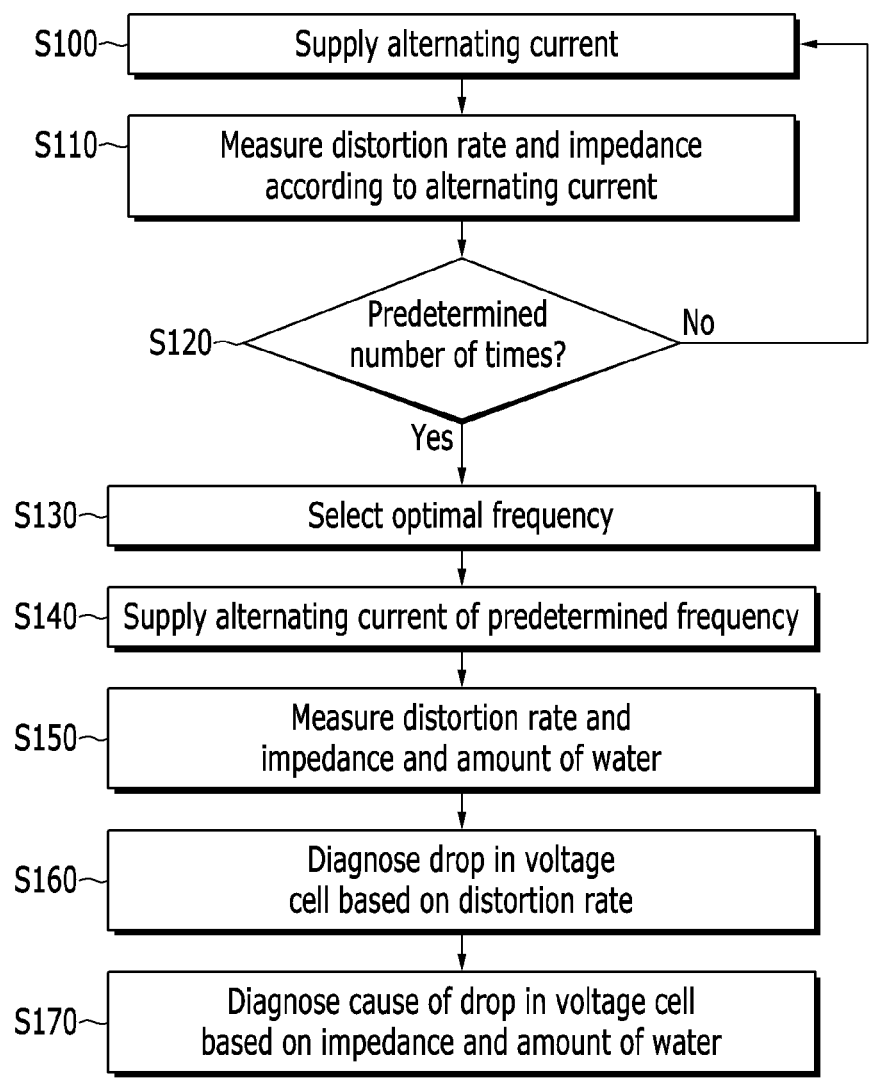
FIG. 5 is a flowchart of a method of diagnosing a fault of a fuel cell stack according to an exemplary embodiment of the present invention.

FIG. 5 is a flowchart of a method of diagnosing a fault of a fuel cell stack according to an exemplary embodiment of the present invention. The fault diagnosis apparatus 1 uses a plurality of alternating currents that includes a plurality of alternating currents of different frequency domains in order to diagnose the fault of the fuel cell stack 2 and diagnose a cause of a drop in cell voltage.

The fault diagnosis apparatus 1 supplies the plurality of alternating currents to the fuel cell stack 2, and measures a distortion rate and impedance and amount of water based on stack voltage and a stack current output from the fuel cell stack 2 (S100 and S110).

For example, when a first alternating current of combination of about 10 Hz and about 300 Hz, a second alternating current of combination of about 8 Hz and about 290 Hz, and a third alternating current of combination of about 12 Hz and about 310 Hz are used, the first alternating current to the third alternating current are sequentially supplied to the fuel cell stack 2, the stack voltage and the stack current are measured according to each supplied alternating current, and the distortion rate, the impedance and the amount of water are measured based on the measured stack voltage and stack current. As a result, the distortion rate, the impedance and the amount of water are calculated for each alternating current. In this case, the above distortion rate, impedance and amount of water calculating process may be performed a total of three times.

For example, as the first alternating current of about 10 Hz is supplied to the stack current through the AC injector 11. Accordingly, the first alternating current is included in the stack current that is output from the fuel cell stack 2 and flows along the load R1. The diagnosis processor 13 measures the stack voltage and the stack current and diagnoses whether the fuel cell stack 2 is faulty based on the measured stack voltage and stack current.

The diagnosis processor 13 measures the stack voltage and calculates the distortion rate based on the measured stack voltage. Also, as the first alternating current of combination of about 10 Hz and about 300 Hz is supplied to the AC injector 11 according to frequency conversion, the diagnosis processor 13 measures the stack voltage and the stack current and measures the impedance and amount of water based on the measured stack voltage and stack current. The above processes are performed similarly even with respect to the second alternating current and the third alternating current.

As described above, when the above distortion rate and impedance and amount of water calculating process is performed a plurality of times according to all of the alternating currents, that is, when the distortion rate and impedance and amount of water calculating process is performed a predetermined number of times (e.g., three times according to the number of alternating currents), the optimal frequency selection processing section 132 selects an optimal frequency of an alternating current for optimal diagnosis (S120 and S130).

The optimal frequency selection processing section 132 selects a frequency in which the largest distortion rate and the largest impedance and amount of water are calculated based on the distortion rates and the impedances measured for the respective alternating currents. Here, the alternating current supplied to the fuel cell stack for frequency selection functions as a test current. In this instance, a frequency in which the largest distortion rate is calculated and a frequency in which the largest impedance and amount of water are calculated may be different from each other. For example, among distortion rates corresponding to the first to third alternating currents, a distortion rate corresponding to the first alternating current may be largest. Among impedances corresponding to the first to third alternating currents, impedance corresponding to the third alternating current may be largest. As described above, the frequency of the alternating current corresponding to when the largest distortion rate and the largest impedance are calculated is selected as the optimal frequency. The frequency corresponding to the largest distortion rate is selected as the optimal frequency (e.g., first optimal frequency) to diagnose the drop in cell voltage, and the frequency corresponding to the largest impedance is selected as the optimal frequency (e.g., second optimal frequency) to diagnose the cause of the drop in cell voltage.

As described above, when the optimal frequencies are selected, the fault diagnosis apparatus 1 substantially performs a fault diagnosis on the fuel cell stack 2 based on the selected optimal frequencies. That is, the fault diagnosis apparatus 1 generates an alternating current including a combination of the first optimal frequency and the second optimal frequency, supplies the generated alternating current to the AC injector 11 (S140), measures the stack voltage, and calculates the distortion rate based on the measured stack voltage. Then, the fault diagnosis apparatus 1 diagnoses the drop in cell voltage based on the calculated distortion rate (S150 and S160).

Also, the fault diagnosis apparatus 1 may measure the stack voltage and the stack current, measure the impedance based on the measured stack voltage and stack current, measure the amount of water based on the measured impedance and diagnose the cause of the drop in cell voltage based on the measured impedance and amount of water (S150 and S170).

The above-mentioned exemplary embodiments of the present invention are not embodied only by an apparatus and method. Alternatively, the above-mentioned exemplary embodiments may be embodied by a program performing functions, which correspond to the configuration of the exemplary embodiments of the present invention, or a recording medium on which the program is recorded. These embodiments can be easily devised from the description of the above-mentioned exemplary embodiments by those skilled in the art to which the present invention pertains.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method of diagnosing a fault of a fuel cell stack, the method comprising:
    supplying, to the fuel cell stack, a plurality of alternating currents having different frequency combinations by an alternating current (AC) current generator;
    measuring, by a processor, a distortion rate and impedance of the fuel cell stack for each alternating current, and selecting an optimal frequency based on the measured distortion rate and impedance;
    supplying, to the fuel cell stack, an alternating current having the selected optimal frequency by the AC current generator;
    calculating, by the processor, the distortion rate of the fuel cell stack according to the alternating current having the optimal frequency, and diagnosing a drop in cell voltage based on the calculated distortion rate; and
    calculating, by the processor, the impedance of the fuel cell stack according to the alternating current having the optimal frequency, amount of water in the fuel cell stack based on the calculated impedance, and diagnosing a cause of the drop in cell voltage based on the calculated impedance and amount of water,
    wherein the selecting of the optimal frequency comprises:
        selecting a first frequency of an alternating current corresponding to a largest distortion rate as a first optimal frequency to diagnose the drop in cell voltage, based on the distortion rates measured for the respective alternating currents; and
        selecting a second frequency of an alternating current corresponding to a largest impedance as a second optimal frequency to diagnose the cause of the drop in cell voltage, based on the impedances measured for the respective alternating currents.

2. The method of claim 1, wherein:
    supplying of the plurality of alternating currents to the fuel cell stack includes supplying, to the fuel cell stack, an alternating current having a first frequency of a first frequency domain to diagnose the drop in cell voltage and an alternating current having a second frequency of a second frequency domain to diagnose the cause of the drop in cell voltage, wherein the plurality of alternating currents has the first frequency and the second frequency that are different from each other.

3. A method of diagnosing a fault of a fuel cell stack, the method comprising:
    supplying, to the fuel cell stack, an alternating current having a first optimal frequency of a first frequency domain to diagnose a drop in cell voltage and an alternating current having a second optimal frequency of a second frequency domain to diagnose a cause of the drop in cell voltage by an alternating current (AC) current generator;
    calculating, by a processor, a distortion rate based on voltage of the fuel cell stack according to the alternating current of the first optimal frequency, and diagnosing the drop in cell voltage based on the calculated distortion rate; and
    calculating, by the processor, impedance based on the voltage and a current of the fuel cell stack according to the alternating current of the second optimal frequency and amount of water in the fuel cell stack based on the calculated impedance, and diagnosing the cause of the drop in cell voltage based on the calculated impedance and amount of water,
    wherein a first frequency of an alternating current corresponding to a largest distortion rate is selected as the first optimal frequency to diagnose the drop in cell voltage, based on the distortion rate for each alternating current, and
    wherein a second frequency of an alternating current corresponding to a largest impedance is selected as the second optimal frequency to diagnose the cause of the drop in cell voltage, based on impedances measure for each alternating current.

4. The method of claim 3, wherein:
    diagnosing of the drop in cell voltage includes diagnosing the drop in cell voltage based on a total harmonic distortion analysis (THDA) method, and
    diagnosing of the cause of the drop in cell voltage includes measuring the impedance using an electromechanical impedance spectroscopy (EIS) and diagnosing the cause of the drop in cell voltage.

5. An apparatus to diagnose a fault of a fuel cell stack, the apparatus comprising:
    an alternating current (AC) injector connected to the fuel cell stack and applying an alternating current to a current which flows from the fuel cell stack to a load;
    an AC current generator configured to generate the applied alternating current; and
    a diagnosis processor configured to measure voltage and a current of the fuel cell stack, to diagnose a drop in cell voltage of the fuel cell stack and to diagnose a cause of the drop in cell voltage based on the measured voltage and current, wherein an optimal frequency is selected by an optimal frequency selection processor based on measured distortion rates and impedance of the fuel cell stack for a plurality of alternating currents, wherein the optimal frequency selection processor is configured to:

select a first frequency of an alternating current corresponding to a largest distortion rate as a first optimal frequency to diagnose the drop in cell voltage, based on distortion rates measured for the respective alternating currents; and select a second frequency of an alternating current corresponding to a largest impedance as a second optimal frequency to diagnose the cause of the drop in cell voltage, based on impedance measured for the respective alternating currents.

6. The apparatus of claim 5, wherein:

the diagnosis processor includes:

the optimal frequency selection processor configured to select the first optimal frequency to diagnose the drop in cell voltage and the second optimal frequency to diagnose the cause of the drop in cell voltage;

an alternating current control section configured to control the AC current generator;

a distortion rate calculating section configured to measure the voltage of the fuel cell stack, and to calculate the distortion rate of the fuel cell stack based on the measured voltage;

an impedance/water calculating section configured to measure the voltage and the current of the fuel cell stack, and to calculate the impedance based on the measured voltage and current and amount of water in the fuel cell stack based on the calculated impedance; and a diagnosis section configured to diagnose the drop in cell voltage of the fuel cell stack based on the distortion rate, and to diagnose the cause of the drop in cell voltage based on the impedance and amount of water.

7. The apparatus of claim 6, wherein:

the AC injector includes electronic devices configured to supply an alternating current according to an alternating signal output from the AC current generator.

8. A non-transitory computer readable medium containing program instructions executed by a processor, the computer readable medium comprising:

program instructions that measure a distortion rate and impedance of the fuel cell stack for each alternating current, and selecting an optimal frequency based on the measured distortion rate and impedance;

program instructions that control supply of an alternating current having the selected optimal frequency by an alternating current (AC) current generator;

program instructions that calculate the distortion rate of the fuel cell stack according to the alternating current having the optimal frequency, and diagnosing a drop in cell voltage based on the calculated distortion rate; and program instructions that calculate the impedance of the fuel cell stack according to the alternating current having the optimal frequency, and diagnosing a cause of the drop in cell voltage based on the calculated impedance, wherein the program instructions selecting of the optimal frequency comprises:

program instructions that select a first frequency of an alternating current corresponding to the largest distortion rate as a first optimal frequency to diagnose the drop in cell voltage, based on the distortion rates measured for the respective alternating currents; and program instructions that select a second frequency of an alternating current corresponding to the largest impedance as a second optimal frequency to diagnose the cause of the drop in cell voltage, based on the impedance measured for the respective alternating currents.

* * * * *